(12) United States Patent
Goyal et al.

(10) Patent No.: US 11,763,082 B2
(45) Date of Patent: Sep. 19, 2023

(54) ACCELERATING INFERENCE OF TRANSFORMER-BASED MODELS

(71) Applicant: International Business Machines Corporation, Armonk, NY (US)

(72) Inventors: Saurabh Goyal, New Delhi (IN); Anamitra Roy Choudhury, New Delhi (IN); Saurabh Manish Raje, Gurgaon (IN); Venkatesan T. Chakaravarthy, New Delhi (IN); Yogish Sabharwal, Gurgaon (IN); Ashish Verma, Nanuet, NY (US)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 17/372,902

(22) Filed: Jul. 12, 2021

(65) Prior Publication Data

US 2023/0015895 A1 Jan. 19, 2023

(51) Int. Cl.
*G06F 40/284* (2020.01)
*G06N 3/0495* (2023.01)
(Continued)

(52) U.S. Cl.
CPC .......... *G06F 40/284* (2020.01); *G06N 3/04* (2013.01); *G06N 3/08* (2013.01)

(58) Field of Classification Search
CPC ...... G06F 40/20; G06F 40/279; G06F 40/284; G06F 40/30; G06N 3/04; G06N 3/0495; G06N 3/08; G06N 3/082; G06N 20/20
(Continued)

(56) References Cited

U.S. PATENT DOCUMENTS 11,200,497 B1 * 12/2021 Yan .................. G06N 3/082
11,521,075 B2 * 12/2022 Clement ............ G06F 40/30
(Continued)

FOREIGN PATENT DOCUMENTS

CN 111625638 A 9/2020
CN 111767711 A 10/2020

OTHER PUBLICATIONS

Gordon MA, Duh K, Andrews N. Compressing bert: Studying the effects of weight pruning on transfer learning. arXiv preprint arXiv:2002.08307. Feb. 19, 2020.
(Continued)

*Primary Examiner* — Martin Lerner
(74) *Attorney, Agent, or Firm* — Ryan, Mason & Lewis, LLP (57) ABSTRACT

Methods, systems, and computer program products for accelerating inference of transformer-based models are provided herein. A computer-implemented method includes obtaining a machine learning model comprising a plurality of transformer blocks, a task, and a natural language dataset; generating a compressed version of the machine learning model based on the task and the natural language dataset, wherein the generating comprises: obtaining at least one set of tokens, wherein each token in the set corresponds to one of the items in the natural language dataset, identifying and removing one or more redundant output activations of different ones of the plurality of transformer blocks for the at least one set of tokens, and adding one or more input activations corresponding to the one or more removed output activations into the machine learning model at subsequent ones of the plurality of the transformer blocks; and outputting the compressed version of the machine learning model to at least one user.

20 Claims, 9 Drawing Sheets

(51) Int. Cl.
*G06N 3/082* (2023.01)
*G06N 3/04* (2023.01)
*G06N 3/08* (2023.01)

(58) Field of Classification Search
USPC .............. 704/1, 9, 232, 257; 706/12, 16, 25
See application file for complete search history.

(56) References Cited

U.S. PATENT DOCUMENTS

| | | | | |
|---|---|---|---|---|
| 2011/0087670 | A1* | 4/2011 | Jorstad | G06F 40/284 |
| | | | | 707/798 |
| 2018/0300400 | A1 | 10/2018 | Paulus | |
| 2019/0147339 | A1* | 5/2019 | Nachum | G06N 3/084 |
| | | | | 706/25 |
| 2019/0378013 | A1* | 12/2019 | Wu | G06N 3/082 |
| 2020/0143250 | A1* | 5/2020 | Lee | G06N 3/08 |
| 2020/0234128 | A1* | 7/2020 | Lin | G06N 3/04 |
| 2021/0073644 | A1* | 3/2021 | Lin | G06N 3/082 |
| 2021/0256385 | A1* | 8/2021 | Wang | G06N 3/082 |
| 2021/0271932 | A1* | 9/2021 | Yang | G06N 3/082 |
| 2021/0342694 | A1* | 11/2021 | Zhu | G06N 3/082 |
| 2022/0027719 | A1* | 1/2022 | Wagner | G06F 40/284 |
| 2022/0067529 | A1* | 3/2022 | Wagner | G06N 3/084 |
| 2022/0108212 | A1* | 4/2022 | Zhai | G06F 40/58 |
| 2022/0180180 | A1* | 6/2022 | Liu | G06N 3/084 |
| 2022/0335303 | A1* | 10/2022 | Haidar | G06N 3/084 |
| 2022/0358358 | A1* | 11/2022 | Raje | G06N 3/08 |
| 2023/0004809 | A1* | 1/2023 | Guo | G06N 3/0495 |

OTHER PUBLICATIONS

Figurnov M, Collins MD, Zhu Y, Zhang L, Huang J, Vetrov D, Salakhutdinov R. Spatially adaptive computation time for residual networks. InProceedings of the IEEE Conference on Computer Vision and Pattern Recognition 2017 (pp. 1039-1048).

Tsai H, Riesa J, Johnson M, Arivazhagan N, Li X, Archer A. Small and practical bert models for sequence labeling. arXiv preprint arXiv:1909.00100. Aug. 31, 2019.

Wang X, Yu F, Dou ZY, Darrell T, Gonzalez JE. Skipnet: Learning dynamic routing in convolutional networks. InProceedings of the European Conference on Computer Vision (ECCV) 2018 (pp. 409-424).

Shen S, Dong Z, Ye J, Ma L, Yao Z, Gholami A, Mahoney MW, Keutzer K. Q-bert: Hessian based ultra low precision quantization of bert. InProceedings of the AAAI Conference on Artificial Intelligence Apr. 3, 2020 (vol. 34, No. 05, pp. 8815-8821).

Jiao X, Yin Y, Shang L, Jiang X, Chen X, Li L, Wang F, Liu Q. Tinybert: Distilling bert for natural language understanding. arXiv preprint arXiv:1909.10351. Sep. 23, 2019.

Michel P, Levy O, Neubig G. Are sixteen heads really better than one?. arXiv preprint arXiv:1905.10650. May 25, 2019.

Goyal S, Choudhury AR, Raje S, Chakaravarthy V, Sabharwal Y, Verma A. Power-bert: Accelerating bert inference via progressive word-vector elimination. InInternational Conference on Machine Learning Nov. 21, 2020 (pp. 3690-3699). PMLR.

Cheong R, Daniel R. transformers. zip: Compressing Transformers with Pruning and Quantization. Technical report, Stanford University, Stanford, California; 2019.

Tang R, Lu Y, Liu L, Mou L, Vechtomova O, Lin J. Distilling task-specific knowledge from bert into simple neural networks. arXiv preprint arXiv:1903.12136. Mar. 28, 2019.

Demir E. Early-exit convolutional neural networks (Master's thesis, Middle East Technical University); Jan. 2019.

Sun S, Cheng Y, Gan Z, Liu J. Patient knowledge distillation for bert model compression. arXiv preprint arXiv:1908.09355. Aug. 25, 2019.

* cited by examiner

ACCELERATING INFERENCE OF TRANSFORMER-BASED MODELS

BACKGROUND

The present application generally relates to information technology and, more particularly, to improved machine learning techniques for natural language processing.

Natural language processing generally relates to interactions between computers and human language. Natural language processing techniques include programming computers so that they are capable of understanding natural language (e.g., speech, documents), including contextual nuances.

SUMMARY

In one embodiment of the present disclosure, techniques for accelerating inference of transformer-based models are provided. An exemplary computer-implemented method includes obtaining a machine learning model comprising a plurality of transformer blocks, a task, and a natural language dataset; generating a compressed version of the machine learning model based on the task and the natural language dataset, wherein the generating comprises: obtaining at least one set of tokens, wherein each token in the set corresponds to one of the items in the natural language dataset, identifying and removing one or more redundant output activations of different ones of the plurality of transformer blocks for the at least one set of tokens, and adding one or more input activations corresponding to the one or more removed output activations into the machine learning model at subsequent ones of the plurality of the transformer blocks; and outputting the compressed version of the machine learning model to at least one user.

Another embodiment of the present disclosure or elements thereof can be implemented in the form of a computer program product tangibly embodying computer readable instructions which, when implemented, cause a computer to carry out a plurality of method steps, as described herein. Furthermore, another embodiment of the present disclosure or elements thereof can be implemented in the form of a system including a memory and at least one processor that is coupled to the memory and configured to perform the noted method steps. Yet further, another embodiment of the present disclosure or elements thereof can be implemented in the form of a means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present disclosure will become apparent from the following detailed description of illustrative embodiments thereof, which is to be read in connection with the accompanying drawings.

DETAILED DESCRIPTION

Natural language processing (NLP) models are used for various tasks such as, for example, sentiment classification, entity recognition, text summarization, and machine translation. One type of NLP model includes transformer-based models, such as Bidirectional Encoder Representations from Transformers ("BERT") models, for example. BERT models use an attention mechanism (named Transformer) that learns contextual relations between words and/or sub-words in text. For example, a BERT model may process representations of words (e.g., word vectors) through a sequence of transformer blocks. The outputs of the last block in the BERT model undergo further processing based on the task being performed. BERT models are typically complex and large, and often need to be fine-tuned for different tasks and datasets.

Processing activations (e.g., corresponding to words) through each transformer block is computationally expensive. This is at least in part due to the self-attention mechanisms that are applied to process the activations. It is to be appreciated that a self-attention mechanism generally includes the following steps:

1. preparing the inputs;
2. initializing the weights for the inputs; deriving a key, query and value representation for each of the inputs based on the weights;
3. calculating attention scores for the first input; calculating the softmax for the attentions scores;
4. multiplying the scores with their corresponding values (calculated in step 3);
5. summing the weighted values to obtain an output for the first input; and
6. repeating steps 4-7 for the other inputs.

Exemplary techniques described herein accelerate an inference transformer-based model with only minimal effects on the accuracy of the model, by reducing the number of operations performed at one or more of the transformer blocks. At least some example embodiments take into account that processing every word through the sequence of transformer blocks may be redundant as the words are not all equally important for an underlying task (such as stop words, and verbs/identifiers for entity recognition, for example). Accordingly, one or more example embodiments accelerate the inference of transformer-based models by selective processing of words, based on their significance, by determining the number of words to be processed at each block, and the specific words to be processed at each block. Additionally, different samples of a particular batch can be processed differently.

Figure 1:
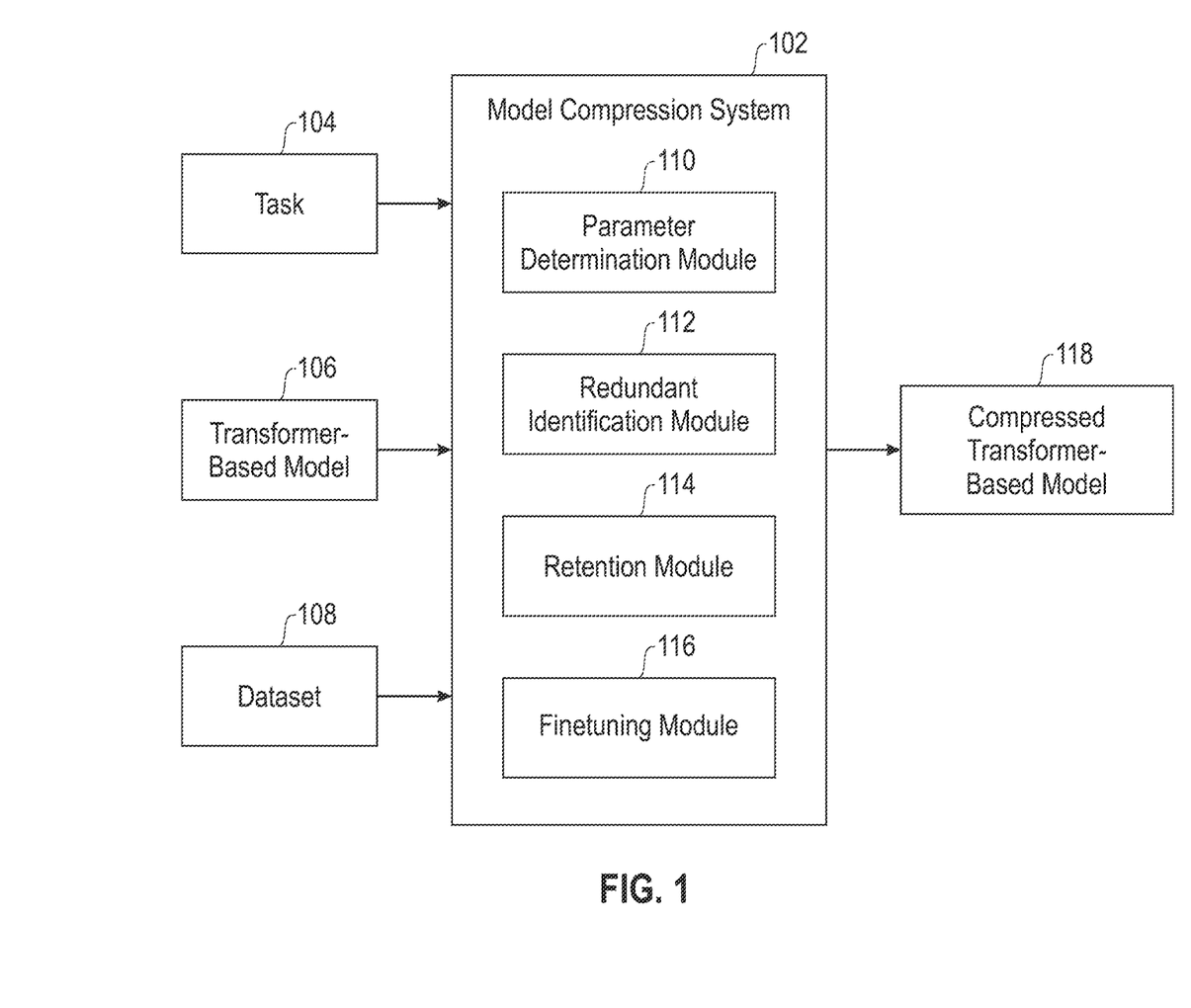
FIG. 1 is a diagram illustrating a system architecture in accordance with exemplary embodiments.

FIG. 1 is a diagram illustrating a system architecture in accordance with exemplary embodiments. By way of illustration, FIG. 1 depicts a model compression system 102, which includes a parameter determination model 110, a redundant identification module 112, a retention module 114, and a finetuning module 116. Generally, the model compression system 102 obtains a task 104, a transformer-based model 106, and a dataset 108 as input to generate a compressed transformer-based model 118. In some examples, the transformer-based model 106 may correspond to a finetuned BERT model, for example.

The parameter determination module 110 determines a set of parameters relevant to the task 104 and dataset 108. The set of parameters may include, for example, frequencies of sequence length of samples in the dataset 108, a number of classes, and a number of training samples for each of the classes.

The redundant identification module 112 determines how many input items (e.g., word vectors) are to be processed at a given transformer block, and which of the input items are to be processed at the given transformer block. The retention module 114 removes or retains input items at each given layer based at least in part on the output of the redundant identification module 112, thereby compressing the transformer-based model 106. The finetuning module 116 finetunes the transformer-based model 106, to generate the compressed transformer-model 118. The functionality associated with modules 110, 112, 114, and 116 is described in more detail in conjunction with FIGS. 2-5.

Figure 2:
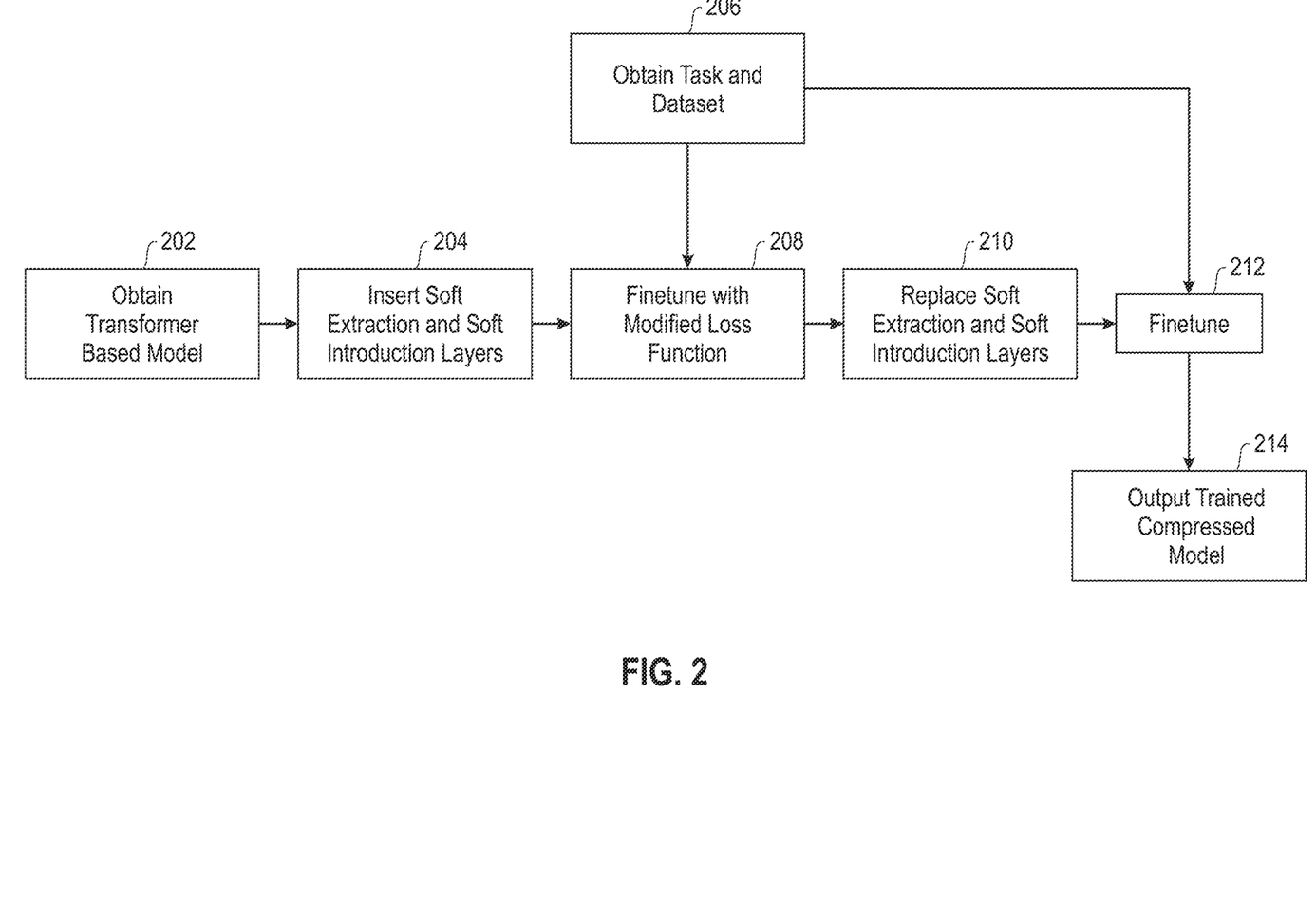
FIG. 2 is a process flow diagram illustrating techniques for accelerating inference of transformer-based models in accordance with exemplary embodiments.

FIG. 2 is a process flow diagram illustrating techniques for accelerating inference of transformer-based models in accordance with exemplary embodiments. Step 202 includes obtaining a transformer-based model. Step 204 includes inserting, into the model, soft extraction layers (also referred to herein as "soft extract layers") and soft introduction layers (also referred to herein as "soft intro layers") having learnable retention parameters r for each input vector representation (e.g., corresponding to a word). Additionally, step 206 includes obtaining a task to be performed by the transformer-based model and a dataset. In some examples, step 206 may also include obtaining or determining dataset parameters (such as the dataset parameters described above in conjunction with module 110 of FIG. 1, for example). Step 208 includes finetuning the model with a modified loss function based on the task, dataset, and dataset parameters. Then, step 210 includes replacing the soft extraction layers and soft introduction layers with hard extract layers and hard introduction layers to compress the model. Step 212 includes finetuning the model based on the task, dataset, and dataset parameters from step 206. Step 214 includes outputting the trained compressed model.

Figure 3:
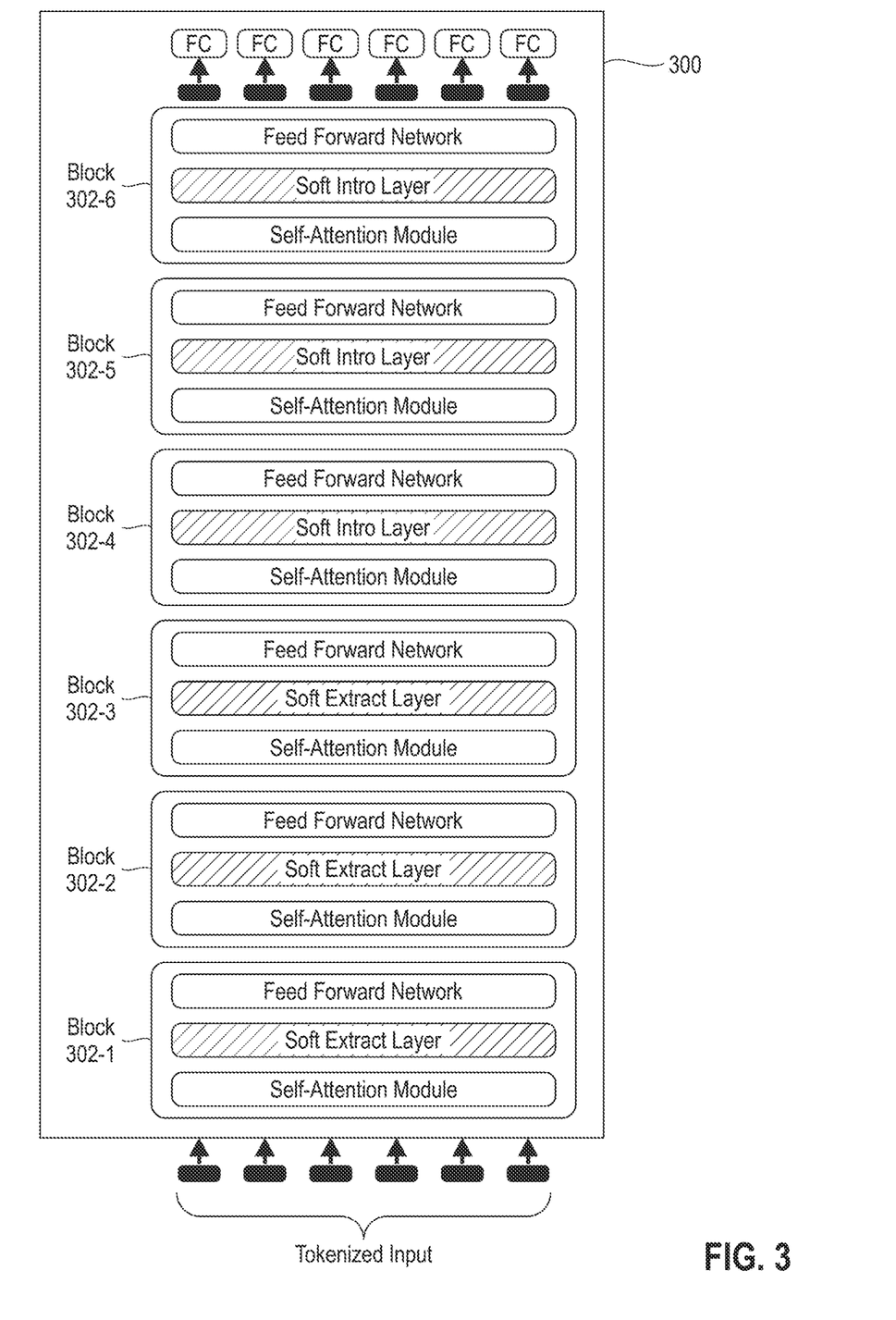
FIG. 3 is a diagram of a transformer-based model with soft extract and soft intro layers in accordance with exemplary embodiments.

FIG. 3 is a diagram of a transformer-based model with soft extraction and soft introduction layers in accordance with exemplary embodiments. The transformer-based model 300 includes six blocks 302-1 ... 302-6 (collectively referred to herein as blocks 302). Each of the blocks include a feed forward network layer and a self-attention module. Additionally, the first three blocks 302-1 to 302-3 each include a soft extract layer, and the last three blocks each include a soft intro layer. FIG. 3 also shows tokenized input. The tokenized input in this example is assumed to include six word vectors, each represented in FIG. 3 as a block with dark shading. The tokenized input is processed at each of the blocks 302. Block 302-6 outputs each of the processed word vectors to respective fully connected ("FC") layers.

The purpose of the soft extract and soft intro layers is to learn the probability with which a given word vector should be retained or removed from each of the transformer blocks 302. More specifically, the soft extract and soft intro layers determine the number of the word vectors that are to be processed at each of the blocks 302, and which particular subset of the word vectors is to be processed. In some example embodiments, the output of the soft extract and soft intro layers is a list of numbers containing the quantity of word vectors to retain at each block. This list is referred to herein as a retention configuration.

Figure 4:
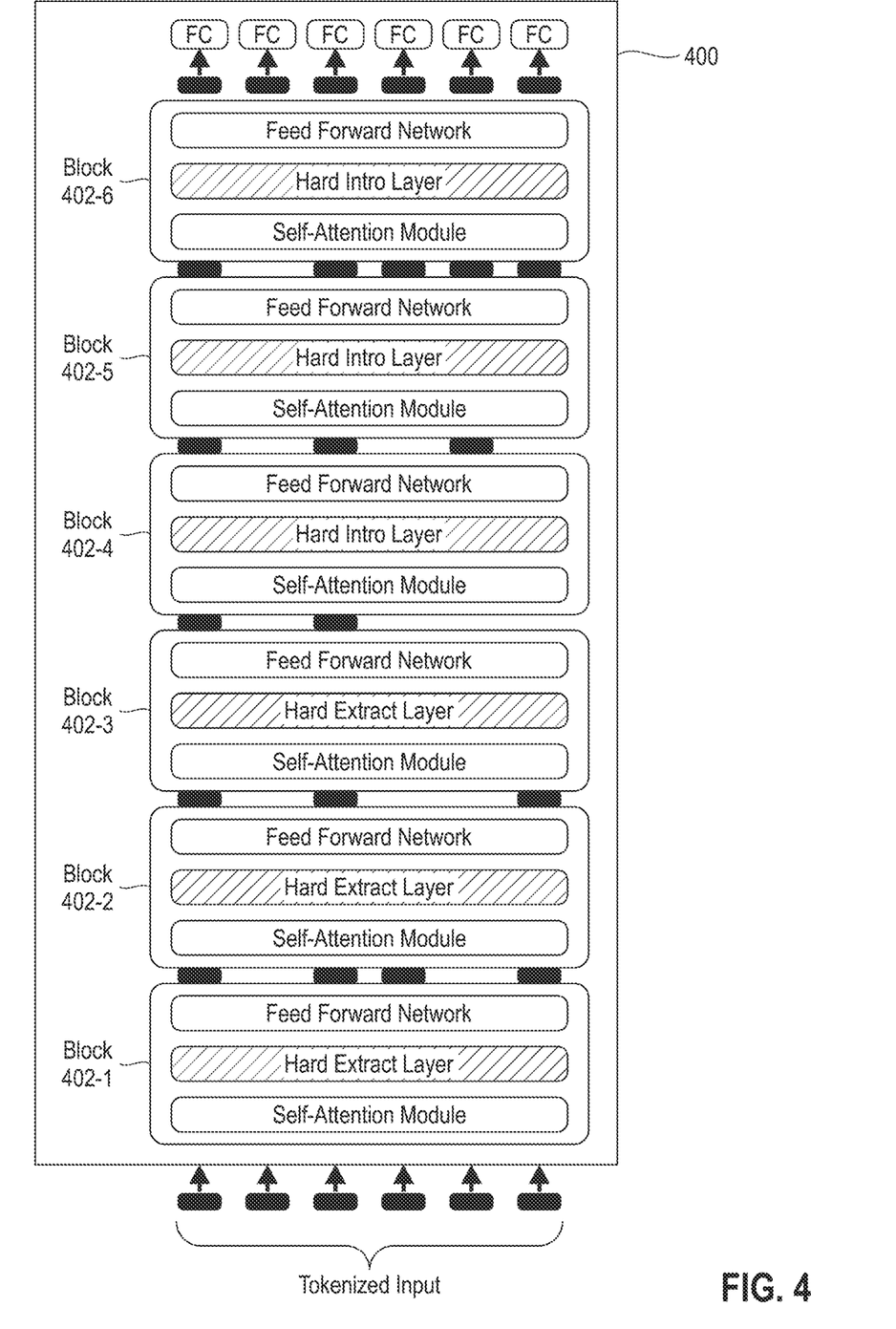
FIG. 4 is a diagram of a transformer-based model with hard extract and hard intro layers in accordance with exemplary embodiments.

Referring also to FIG. 4, this figure shows another transformer-based model 400 in accordance with exemplary embodiments. The transformer-based model 400 in FIG. 4 is similar to the transformer-based model 300. In particular, the transformer-based model 400 includes six blocks 402-1 ... 402-6 (collectively referred to herein as blocks 402), however the soft extract layers have been replaced with hard extract layers and the soft intro layers have been replaced with hard intro layers. The purpose of the hard extract layers and hard intro layers is to remove or retain the word vectors at each of the blocks 402. More specifically, the hard extract layers compute significance scores of the input activations so that the top word vectors are retained, as specified by the retention configuration obtained from the soft extraction layer for that layer. The hard intro layers compute the mean (e.g., normalized) significance scores of the input activations across the blocks 402 on which the input activations are active, and retain the top words, as specified by the retention configuration for that layer.

The significance score may be calculated by a suitable measure of significance of individual word vectors that is computed by each of the extract layers that the word vectors cross. As an example, each word vector may be given a significance score based on the attention matrix obtained by the self-attention mechanism, using the following equations:

$Sig_h(w) = \Sigma_{w'} A_h[w', w]$, where $A_h[w', w]$ is the attention imposed by $w$ on $w'$ at attention head $h$;

$Sig(w) = \Sigma_h Sig_h[w]$.

FIG. 4 shows the different word vectors of the tokenized input that are input and output at each of the blocks 402 (e.g., the output of block 402-1 includes only four of the six word vectors from the tokenized input).

The soft extract layers and soft intro layers, in some embodiments, capture the processing extent of each of the word vectors in the tokenized input and retain all of the word vectors, but to varying degrees, as determined by their significance. As an example, for a given transformer block j, the word vectors may be sorted according to their significance scores and multiplied with the retention parameters $r_j[k]$, where $k=1 \ldots N$, where N is the number of tokens in the tokenized input. The following mass function may be applied to determine which words to retain at transformer block j: $mass(j; r) = \Sigma_{k=1}^{N} r_j[k]$. It is noted that the following loss function may be used to finetune the model with the soft intro and soft extract layers: $\min [\mathcal{L}(\Theta, r) + \lambda \Sigma_{j=1}^{L} mass(j; r)]$, where $\mathcal{L}(\Theta, r)$ is the loss function and $\lambda$ is a regularization parameter.

Figure 5:
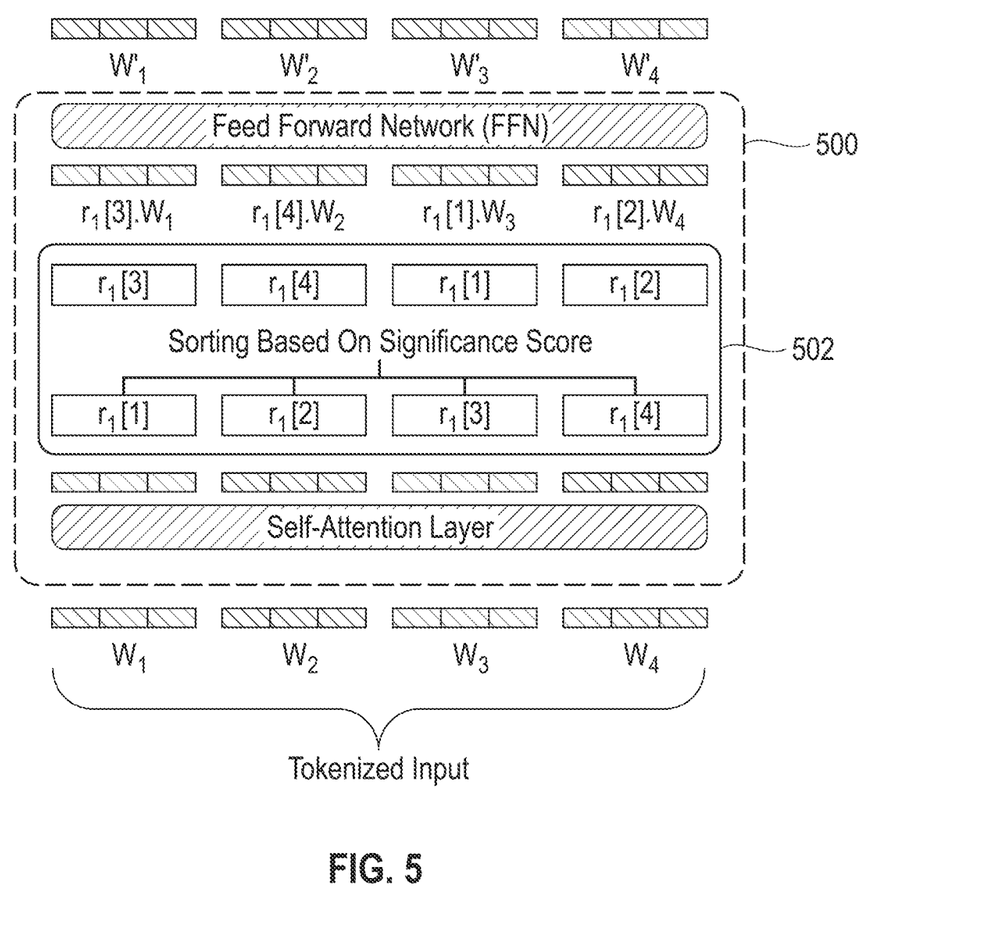
FIG. 5 is a diagram illustrating a soft extract layer in accordance with exemplary embodiments.

FIG. 5 is a diagram illustrating an example of a transformer block 500 having a soft layer 502 in accordance with exemplary embodiments. In this example, block 500 obtains tokenized input in the form of four words, namely, $W_1$, $W_2$, $W_3$, and $W_4$, which is processed by the self-attention layer.

The output of the self-attention layer is provided to the soft layer 502, which sorts the words according to their significance scores and multiplies them by their significance score as shown in FIG. 5. Accordingly, the significance score captures the relative importance of the word vector in a sentence as per the underlying task.

Accordingly, one or more example embodiments described herein reduce output activations corresponding to one or more tokens, and their subsequent processing at later transformer blocks to reducing inference time and runtime memory usage.

Figure 6:
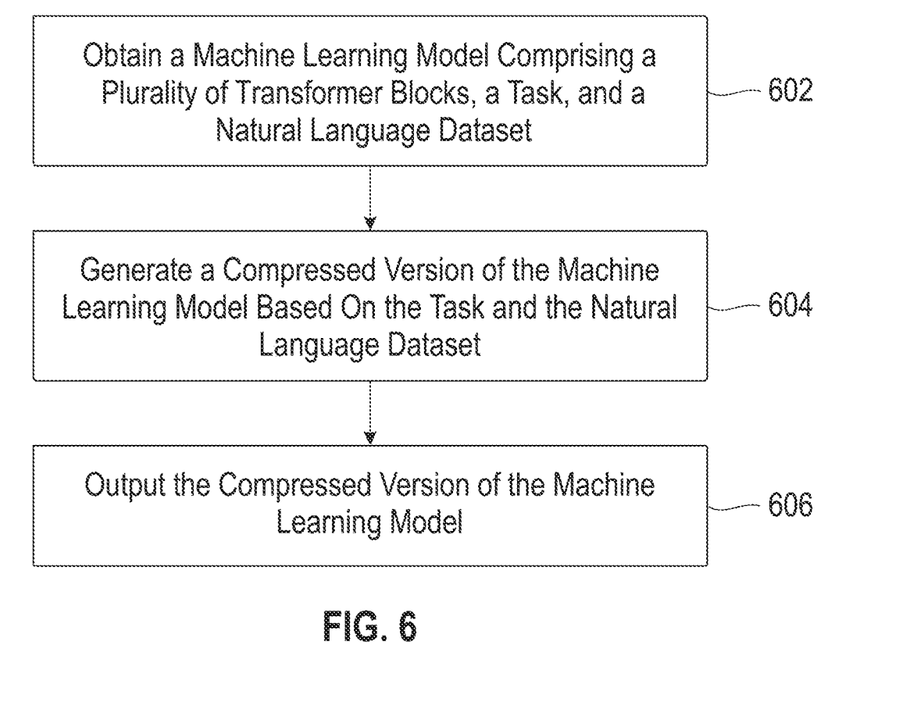
FIG. 6 is a flow diagram illustrating techniques in accordance with exemplary embodiments.

FIG. 6 is a flow diagram illustrating techniques in accordance with exemplary embodiments. Step 602 includes obtaining a machine learning model comprising a plurality of transformer blocks, a task, and a natural language dataset. Step 604 includes generating a compressed version of the machine learning model based on the task and the natural language dataset. The generating may include: obtaining at least one set of tokens, wherein each token in the set corresponds to one of the items in the natural language dataset, identifying and removing one or more redundant output activations of different ones of the plurality of transformer blocks for the at least one set of tokens, and adding one or more input activations corresponding to the one or more removed output activations into the machine learning model at subsequent ones of the plurality of the transformer blocks. Step 606 includes outputting the compressed version of the machine learning model to at least one user.

The generating may include inserting one or more extraction layers into a first subset of the plurality of transformer blocks and one or more introduction layers into a second subset of the plurality of transformer blocks; and using the one or more extraction layers and the one or more introduction layers to perform the identifying, the removing, and the adding. Each of the one or more extraction layers and each of the one or more introduction layers may learn a set of retention parameters, wherein the set of retention parameters corresponding to a given one of the layers indicates: (i) whether a given one of the tokens in the at least one set is to be retained and (ii) whether a given one of the tokens in the at least one set is to be processed at the given layer. The set of retention parameters may be determined based at least in part on significance scores computed for vector representations corresponding to the at least one set of tokens. The significance score for a given one of the vector representations may be computed based on an attention matrix obtained using a self-attention mechanism. The machine learning model, with the one or more inserted extraction layers and the one or more inserted introduction layers, may be finetuned using a loss function based at least in part on: (i) a total retention value determined for each of the transformer blocks of the machine learning model and (ii) a depth of each of the transformer blocks. The process depicted in FIG. 6 may further include determining a set of values for the natural language dataset and the task, wherein the set of values comprise at least one of: frequencies of input sequence lengths of the natural language dataset, a number of classes in the natural language dataset, and a number of samples in each of the classes. The generating may be based at least in part on the set of values. The task may include at least one of: a classification task; an entity recognition task; a text summarization task; and a sentence embedding task. The natural language dataset may include plurality of words.

The techniques depicted in FIG. 6 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the present disclosure, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 6 can be implemented via a computer program product that can include computer useable program code that is stored in a computer readable storage medium in a data processing system, and wherein the computer useable program code was downloaded over a network from a remote data processing system. Also, in an embodiment of the present disclosure, the computer program product can include computer useable program code that is stored in a computer readable storage medium in a server data processing system, and wherein the computer useable program code is downloaded over a network to a remote data processing system for use in a computer readable storage medium with the remote system.

An exemplary embodiment or elements thereof can be implemented in the form of an apparatus including a memory and at least one processor that is coupled to the memory and configured to perform exemplary method steps.

Figure 7:
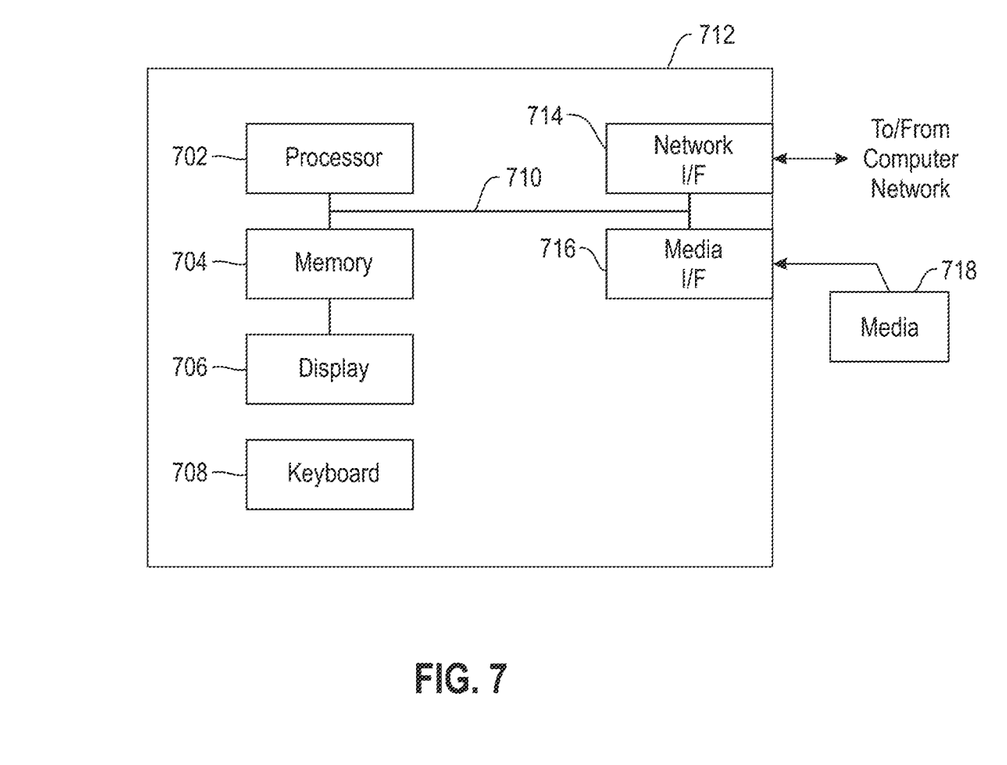
FIG. 7 is a system diagram of an exemplary computer system on which at least one embodiment of the present disclosure can be implemented.

Additionally, an embodiment of the present disclosure can make use of software running on a computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the present disclosure, as described herein, may be stored in associated memory devices (for example, ROM, fixed or removable memory) and, when ready to be utilized, loaded in part or in whole (for example, into RAM) and implemented by a CPU.

Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

An exemplary embodiment may include a system, a method, and/or a computer program product at any possible technical detail level of integration. The computer program product may include a computer readable storage medium (or media) having computer readable program instructions thereon for causing a processor to carry out exemplary embodiments of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present disclosure.

Embodiments of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 702. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings provided herein, one of ordinary skill in the related art will be able to contemplate other implementations of the components.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
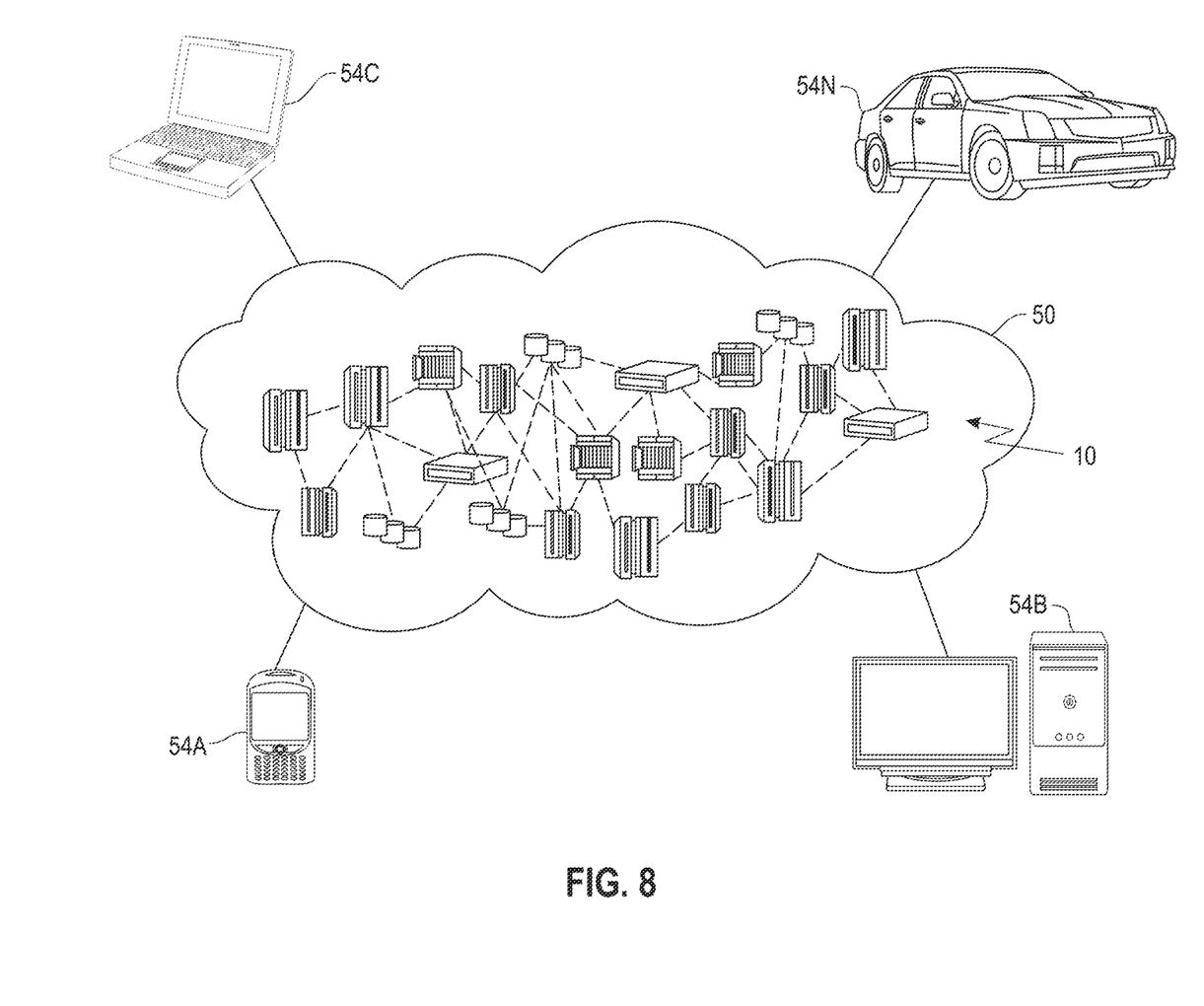
FIG. 8 depicts a cloud computing environment in accordance with exemplary embodiments.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
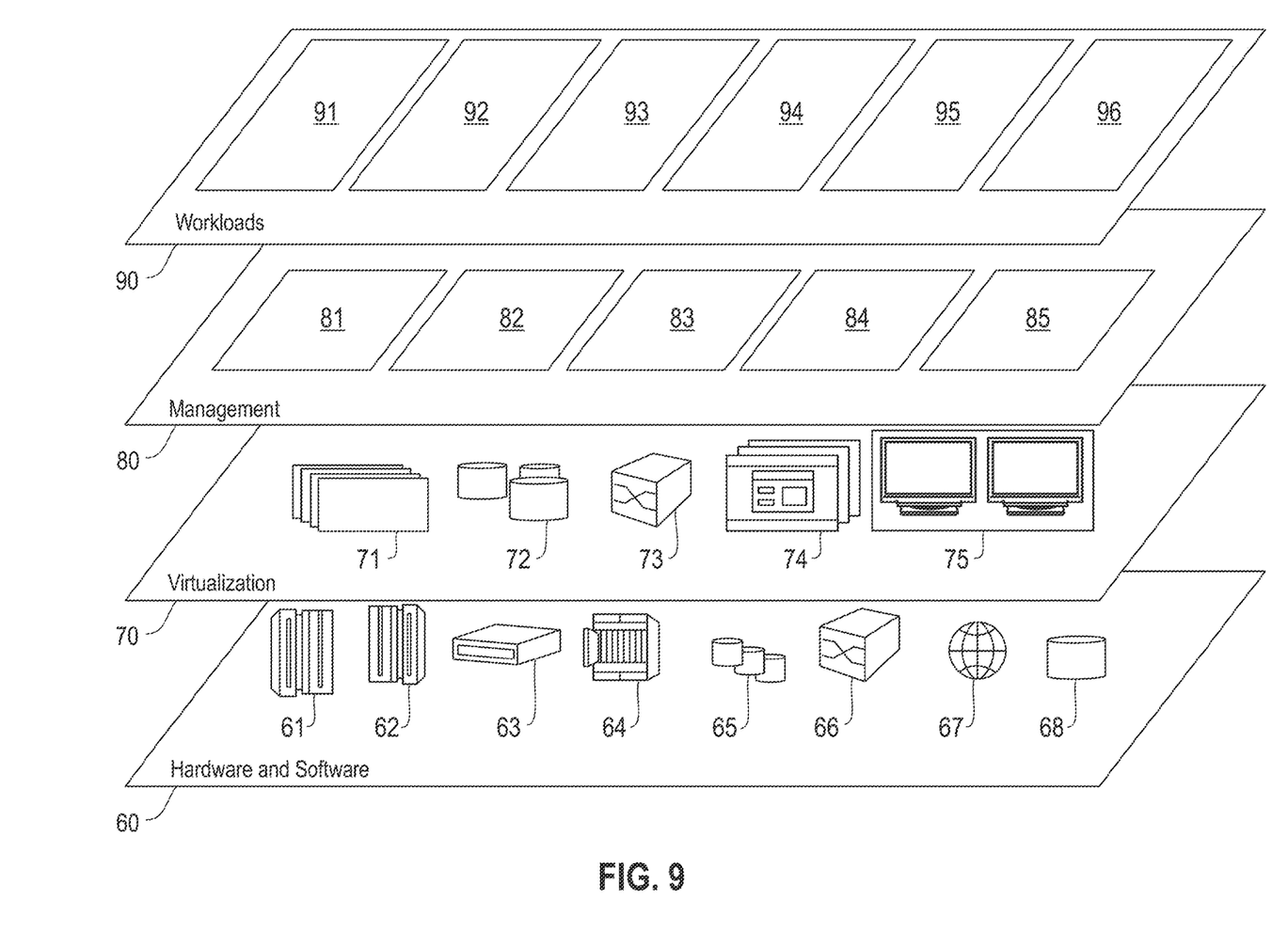
FIG. 9 depicts abstraction model layers in accordance with exemplary embodiments.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and accelerating inference of transformer-based models 96, in accordance with the one or more embodiments of the present disclosure.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present disclosure may provide a beneficial effect such as, for example, reducing inference time and/or runtime memory usage of transformer-based models.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
   obtaining a machine learning model comprising a plurality of transformer blocks, a task, and a natural language dataset;
   generating a compressed version of the machine learning model based on the task and the natural language dataset, wherein the generating comprises:
      obtaining at least one set of tokens, wherein each token in the set corresponds to one of the items in the natural language dataset,
      identifying and removing one or more redundant output activations of different ones of the plurality of transformer blocks for the at least one set of tokens, and
      adding one or more input activations corresponding to the one or more removed output activations into the machine learning model at subsequent ones of the plurality of the transformer blocks; and
   outputting the compressed version of the machine learning model to at least one user;
   wherein the method is carried out by at least one computing device.

2. The computer-implemented method of claim 1, wherein the generating comprises:
inserting one or more extraction layers into a first subset of the plurality of transformer blocks and one or more introduction layers into a second subset of the plurality of transformer blocks; and
using the one or more extraction layers and the one or more introduction layers to perform the identifying, the removing, and the adding.

3. The computer-implemented method of claim 2, wherein each of the one or more extraction layers and each of the one or more introduction layers learn a set of retention parameters, wherein the set of retention parameters corresponding to a given one of the layers indicates: (i) whether a given one of the tokens in the at least one set is to be retained and (ii) whether a given one of the tokens in the at least one set is to be processed at the given layer.

4. The computer-implemented method of claim 3, wherein the set of retention parameters is determined based at least in part on significance scores computed for vector representations corresponding to the at least one set of tokens.

5. The computer-implemented method of claim 4, wherein the significance score for a given one of the vector representations is computed based on an attention matrix obtained using a self-attention mechanism.

6. The computer-implemented method of claim 2, wherein the machine learning model, with the one or more inserted extraction layers and the one or more inserted introduction layers, is finetuned using a loss function based at least in part on: (i) a total retention value determined for each of the transformer blocks of the machine learning model and (ii) a depth of each of the transformer blocks.

7. The computer-implemented method of claim 1, comprising:
determining a set of values for the natural language dataset and the task, wherein the set of values comprise at least one of: frequencies of input sequence lengths of the natural language dataset, a number of classes in the natural language dataset, and a number of samples in each of the classes.

8. The computer-implemented method of claim 7, wherein the generating is based at least in part on the set of values.

9. The computer-implemented method of claim 1, wherein the task comprises at least one of:
a classification task;
an entity recognition task;
a text summarization task; and
a sentence embedding task.

10. The computer-implemented method of claim 1, wherein the natural language dataset comprises a plurality of words.

11. The computer-implemented method of claim 1, wherein software is provided as a service in a cloud environment.

12. A computer program product comprising a computer readable storage medium having program instructions embodied therewith, the program instructions executable by a computing device to cause the computing device to:
obtain a machine learning model comprising a plurality of transformer blocks, a task, and a natural language dataset;
generate a compressed version of the machine learning model based on the task and the natural language dataset, wherein the generating comprises:
obtaining at least one set of tokens, wherein each token in the set corresponds to one of the items in the natural language dataset,
identifying and removing one or more redundant output activations of different ones of the plurality of transformer blocks for the at least one set of tokens, and
adding one or more input activations corresponding to the one or more removed output activations into the machine learning model at subsequent ones of the plurality of the transformer blocks; and
output the compressed version of the machine learning model to at least one user.

13. The computer program product of claim 12, wherein the generating comprises:
inserting one or more extraction layers into a first subset of the plurality of transformer blocks and one or more introduction layers into a second subset of the plurality of transformer blocks; and
using the one or more extraction layers and the one or more introduction layers to perform the identifying, the removing, and the adding.

14. The computer program product of claim 13, wherein each of the one or more extraction layers and each of the one or more introduction layers learn a set of retention parameters, wherein the set of retention parameters corresponding to a given one of the layers indicates: (i) whether a given one of the tokens in the at least one set is to be retained and (ii) whether a given one of the tokens in the at least one set is to be processed at the given layer.

15. The computer program product of claim 14, wherein the set of retention parameters is determined based at least in part on significance scores computed for vector representations corresponding to the at least one set of tokens.

16. The computer program product of claim 15, wherein the significance score for a given one of the vector representations is computed based on an attention matrix obtained using a self-attention mechanism.

17. The computer program product of claim 13, wherein the machine learning model, with the one or more inserted extraction layers and the one or more inserted introduction layers, is finetuned using a loss function based at least in part on: (i) a total retention value determined for each of the transformer blocks of the machine learning model and (ii) a depth of each of the transformers.

18. The computer program product of claim 12, wherein the program instructions executable by a computing device further cause the computing device to:
determine a set of values for the natural language dataset and the task, wherein the set of values comprise at least one of: frequencies of input sequence lengths of the natural language dataset, a number of classes in the natural language dataset, and a number of samples in each of the classes.

19. The computer program product of claim 18, wherein the generating is based at least in part on the set of values.

20. A system comprising:
a memory configured to store program instructions;
a processor operatively coupled to the memory to execute the program instructions to:
obtain a machine learning model comprising a plurality of transformer blocks, a task, and a natural language dataset;
generate a compressed version of the machine learning model based on the task and the natural language dataset, wherein the generating comprises:

obtaining at least one set of tokens, wherein each token in the set corresponds to one of the items in the natural language dataset, identifying and removing one or more redundant output activations of different ones of the plurality of transformer blocks for the at least one set of tokens, and adding one or more input activations corresponding to the one or more removed output activations into the machine learning model at subsequent ones of the plurality of the transformer blocks; and output the compressed version of the machine learning model to at least one user.

* * * * *